United States Patent
Morimoto

(10) Patent No.: US 11,967,985 B2
(45) Date of Patent: Apr. 23, 2024

(54) OPTICAL COMMUNICATION DEVICE AND COMMUNICATION SYSTEM

(71) Applicant: Mitsubishi Electric Corporation, Tokyo (JP)

(72) Inventor: Mitsuya Morimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 206 days.

(21) Appl. No.: 17/773,619

(22) PCT Filed: Nov. 20, 2019

(86) PCT No.: PCT/JP2019/045437
§ 371 (c)(1),
(2) Date: May 2, 2022

(87) PCT Pub. No.: WO2021/100146
PCT Pub. Date: May 27, 2021

(65) Prior Publication Data
US 2022/0376785 A1   Nov. 24, 2022

(51) Int. Cl.
*H04B 10/077* (2013.01)
*H04B 10/40* (2013.01)

(52) U.S. Cl.
CPC ..... *H04B 10/0771* (2013.01); *H04B 10/0779* (2013.01); *H04B 10/40* (2013.01)

(58) Field of Classification Search
CPC ... H04B 10/0779; H04B 10/40; H04B 10/771
(Continued)

(56) References Cited

U.S. PATENT DOCUMENTS 7,738,461 B2 * 6/2010 Nakamura ............ H04L 1/0072
370/403
10,033,517 B2 * 7/2018 Arakawa ............... H04J 3/0652
(Continued)

FOREIGN PATENT DOCUMENTS

CN   105721057 A  *  6/2016 ......... H04B 10/2575
JP   2007-96847 A      4/2007
(Continued)

OTHER PUBLICATIONS

Felser et al; Is a Generic Interface for Power Drive Systems possible; Sep. 2005; IEEE; pp. 1-8. (Year: 2005).*
(Continued)

*Primary Examiner* — Amritbir K Sandhu
(74) *Attorney, Agent, or Firm* — XSENSUS LLP

(57) ABSTRACT

An OLT includes an NNI-PHY, a transmission reception unit that transmits a frame transmitted by an ONU, a control unit that transmits the frame if the transmission reception unit received the frame and the frame is not damaged, a process execution unit that executes a process of transmitting the frame to the NNI-PHY if the frame is the specific frame, and a monitoring judgment unit that executes at least one of a process of judging that the frame was discarded in the control unit if the frame does not pass between the control unit and the process execution unit within a first time and a process of judging that the frame was discarded in the process execution unit if the frame does not pass between the process execution unit and the NNI-PHY within a second time.

8 Claims, 14 Drawing Sheets

(58) Field of Classification Search
USPC .......................................................... 398/10
See application file for complete search history.

(56) References Cited

U.S. PATENT DOCUMENTS

| | | | |
|---|---|---|---|
| 10,524,219 B2* | 12/2019 | Ito | H04W 72/29 |
| 2007/0073508 A1 | 3/2007 | Taniguchi et al. | |
| 2007/0223490 A1* | 9/2007 | Mizutani | H04Q 11/0067 |
| | | | 370/395.6 |
| 2014/0112339 A1* | 4/2014 | Safranek | H04L 9/0662 |
| | | | 370/389 |
| 2022/0376785 A1* | 11/2022 | Morimoto | H04B 10/40 |

FOREIGN PATENT DOCUMENTS

| | | | |
|---|---|---|---|
| JP | 2012151760 A | * | 8/2012 |
| JP | 2015-139184 A | | 7/2015 |

OTHER PUBLICATIONS

International Search Report and Written Opinion dated Dec. 24, 2020, received for PCT Application PCT/JP2019/045437, Filed on Nov. 20, 2019, 6 pages including English Translation.
IEEE, "Part 3: Carrier sense multiple access with Collision Detection (CSMA/CD) Access Method and Physical Layer Specifications", IEEE Computer Society, IEEE Std 802.3™-2008, Dec. 26, 2008, 2977 pages.
"Internet Protocol", DARPA Internet Program, Protocol Specification, RFC 791, Sep. 1981, pp. 1-45.
"Transmission Control Protocol", DARPA Internet Program, Protocol Specification, RFC 793, Sep. 1981, pp. 1-85.

* cited by examiner

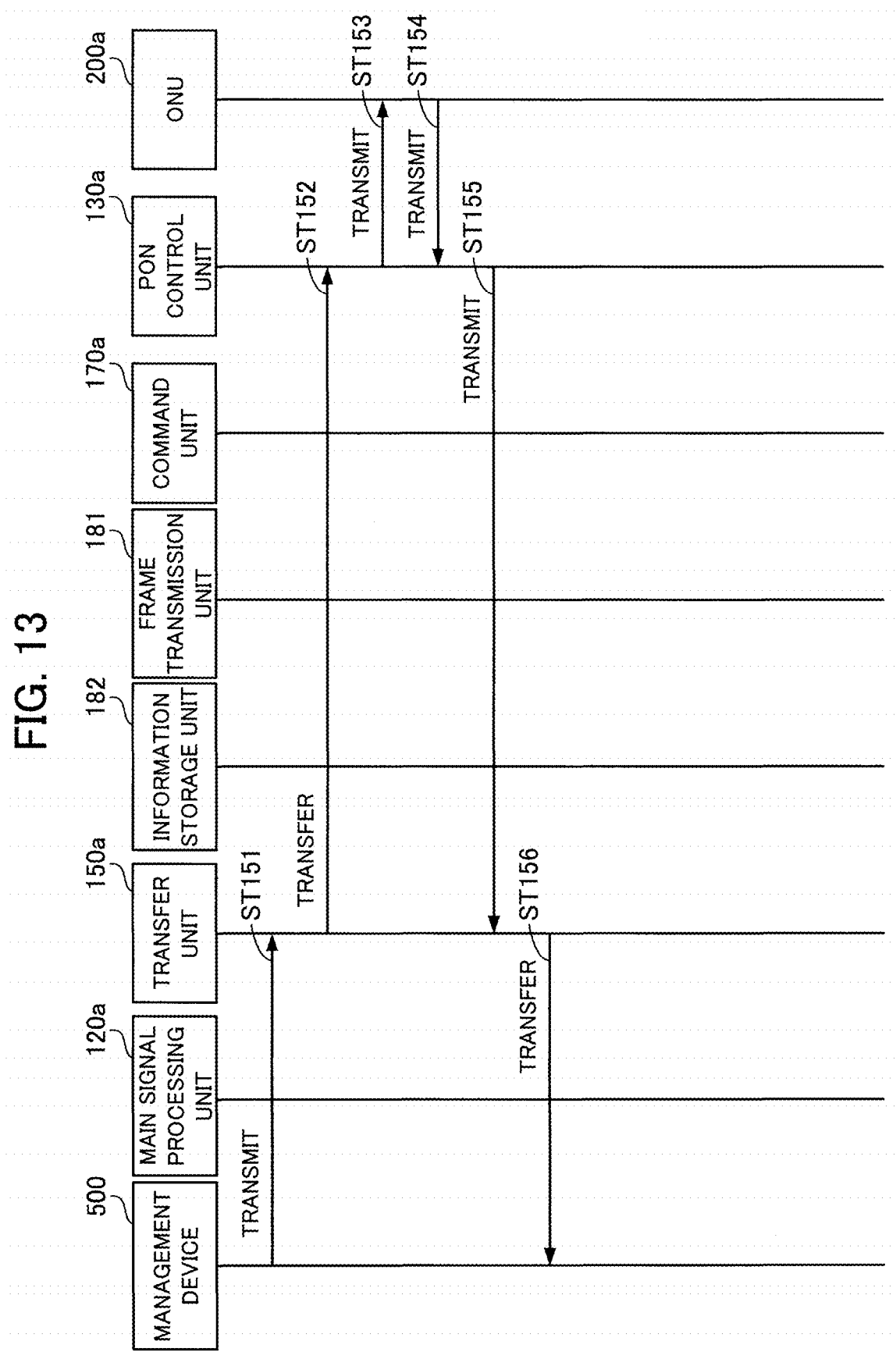

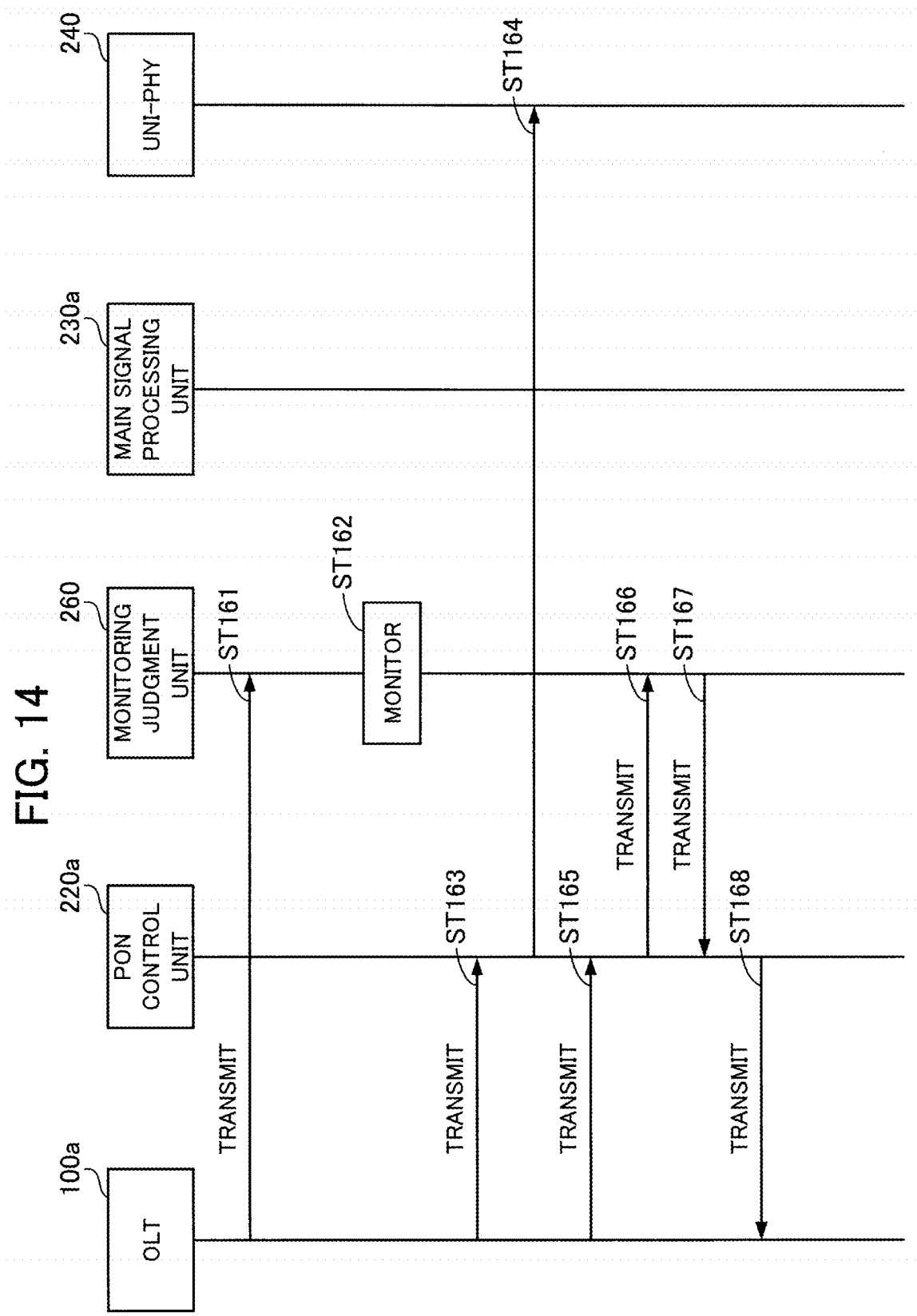

OPTICAL COMMUNICATION DEVICE AND COMMUNICATION SYSTEM

CROSS-REFERENCE TO RELATED APPLICATION

The present application is based on PCT filing PCT/JP2019/045437, filed Nov. 20, 2019, the entire contents of which are incorporated herein by reference.

TECHNICAL FIELD

The present disclosure relates to an optical communication device and a communication system.

BACKGROUND ART

There has been known a Passive Optical Network (PON) system that is an optical communication system. The PON system includes an optical communication device (referred to also as a master station device) installed in a station of a telecommunications carrier and a plurality of optical communication devices (referred to also as slave station devices) on the subscribers' side (referred to also as the slave stations' side). The master station device is referred to as an Optical Line Termination (OLT). The slave station device is referred to as an Optical Network Unit (ONU). The PON system is capable of providing a high-speed access service at a low price. At present, the ONU is being installed in households.

In such a circumstance, there has been known an optical access/network testing device that receives reception frames from the OLT (see Patent Reference 1).

PRIOR ART REFERENCE

Patent Reference

Patent Reference 1: Japanese Patent Application Publication No. 2007-96847

Non-Patent Reference

Non-patent Reference 1: IEEE 802.3, 2008
Non-patent Reference 2: RFC 791, 1981
Non-patent Reference 3: RFC 793, 1981

SUMMARY OF THE INVENTION

Problem to be Solved by the Invention

Incidentally, there are cases where a frame is discarded in an optical communication device. Therefore, a user wants to learn where a frame is discarded. However, it is difficult to identify where the frame is discarded.

An object of the present disclosure is to easily identify the place where a frame is discarded.

Means for Solving the Problem

An optical communication device according to an aspect of the present disclosure is provided. The optical communication device is a master station device that communicates with a slave station device. The optical communication device includes a physical interface, a transmission reception unit that receives a frame transmitted by the slave station device and transmits the frame, a control unit that judges whether the transmission reception unit received the frame at predetermined timing or not when the frame transmitted by the transmission reception unit is received and transmits the frame if the transmission reception unit received the frame at the timing and the frame is not damaged, a process execution unit that executes a judgment process of judging whether or not the frame transmitted by the control unit is a specific frame as a frame being specific and executes a process of transmitting the frame to the physical interface if the frame is the specific frame, and a monitoring judgment unit that executes at least one of a process of monitoring whether the frame passes between the control unit and the process execution unit within a predetermined first time or not and judging that the frame was discarded in the control unit if the frame does not pass between the control unit and the process execution unit within the first time and a process of monitoring whether the frame passes between the process execution unit and the physical interface within a predetermined second time or not and judging that the frame was discarded in the process execution unit if the frame does not pass between the process execution unit and the physical interface within the second time.

Effect of the Invention

According to the present disclosure, the place where a frame is discarded can be easily identified.

BRIEF DESCRIPTION OF THE DRAWINGS

FIG. 13 is a sequence diagram (No. 2) showing an example of a process executed by the OLT and the management device in the second embodiment.

FIG. 14 is a sequence diagram showing an example of a process executed by the ONU in the second embodiment.

MODE FOR CARRYING OUT THE INVENTION

Embodiments will be described below with reference to the drawings. The following embodiments are just examples and a variety of modifications are possible within the scope of the present disclosure.

First Embodiment

Figure 1:
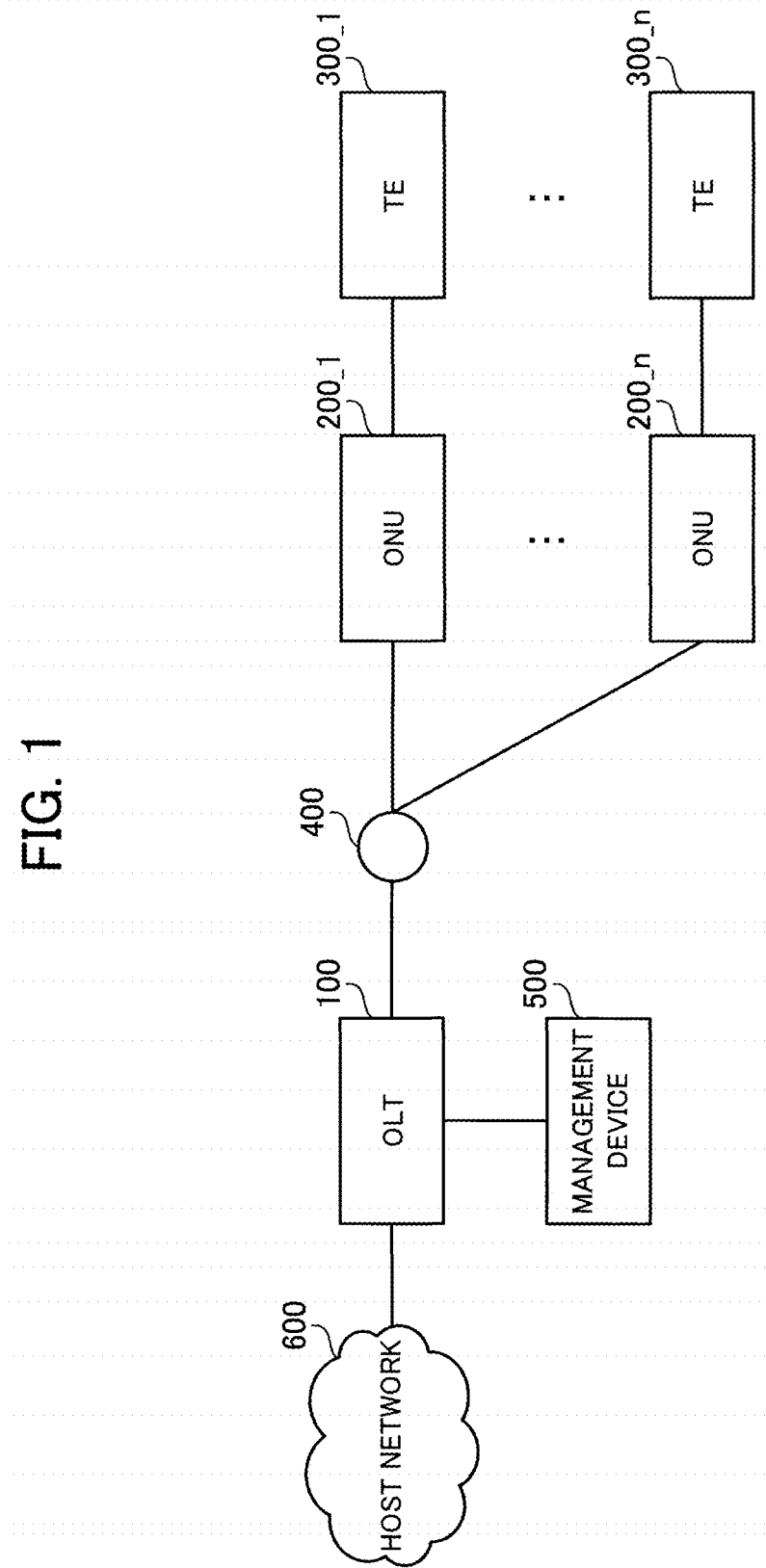
FIG. 1 is a diagram showing a communication system in a first embodiment.

FIG. 1 is diagram showing a communication system in a first embodiment. The communication system includes an OLT 100 and ONUs 200_1 to 200_n (n: integer greater than or equal to 2). The OLT 100 and the ONUs 200_1 to 200_n communicate with each other via an optical splitter 400. The ONUs 200_1 to 200_n are respectively connected to Terminal Equipment (TE) 300_1 to 300_n (n: integer greater than or equal to 2).

Here, the communication system may include the TE 300_1 to 300_n and a management device 500. The OLT 100 is connected to the management device 500. Further, the OLT 100 is connected to a host network 600.

Here, the ONUs 200_1 to 200_n are collectively referred to as ONUs 200. The TE 300_1 to 300_n are collectively referred to as TE 300. The TE 300 is a Personal Computer (PC), for example. The management device 500 is a device used by a user.

Next, hardware included in the OLT 100 will be described below.

Figure 2:
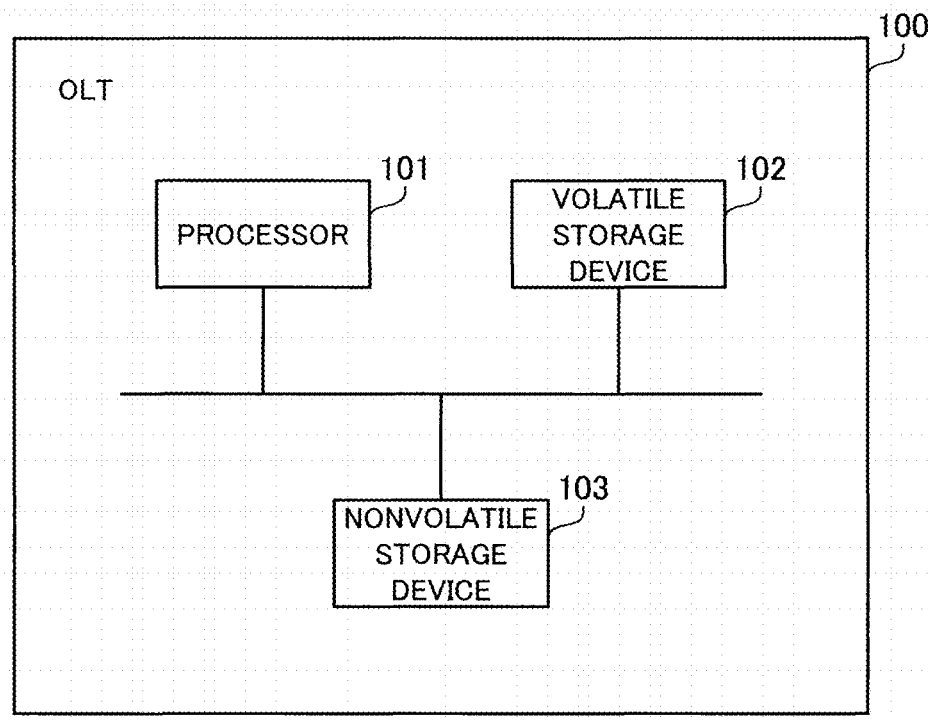
FIG. 2 is a diagram showing the configuration of hardware included in an OLT in the first embodiment.

FIG. 2 is a diagram showing the configuration of the hardware included in the OLT in the first embodiment. The OLT 100 includes a processor 101, a volatile storage device 102 and a nonvolatile storage device 103.

The processor 101 controls the whole of the OLT 100. For example, the processor 101 is a Central Processing Unit (CPU), a Field Programmable Gate Array (FPGA) or the like. The processor 101 can also be a multiprocessor. The OLT 100 may also be implemented by a processing circuitry or implemented by software, firmware or a combination of software and firmware. Incidentally, the processing circuitry may be either a single circuit or a combined circuit.

The volatile storage device 102 is main storage of the OLT 100. The volatile storage device 102 is a Random Access Memory (RAM), for example. The nonvolatile storage device 103 is auxiliary storage of the OLT 100. The nonvolatile storage device 103 is a Hard Disk Drive (HDD) or a Solid State Drive (SSD), for example.

Further, each of the ONUs 200, the TE 300 and the management device 500 includes a processor, a volatile storage device and a nonvolatile storage device similarly to the OLT 100.

Next, functions of the OLT 100 and the ONU 200 will be described below.

Figure 3:
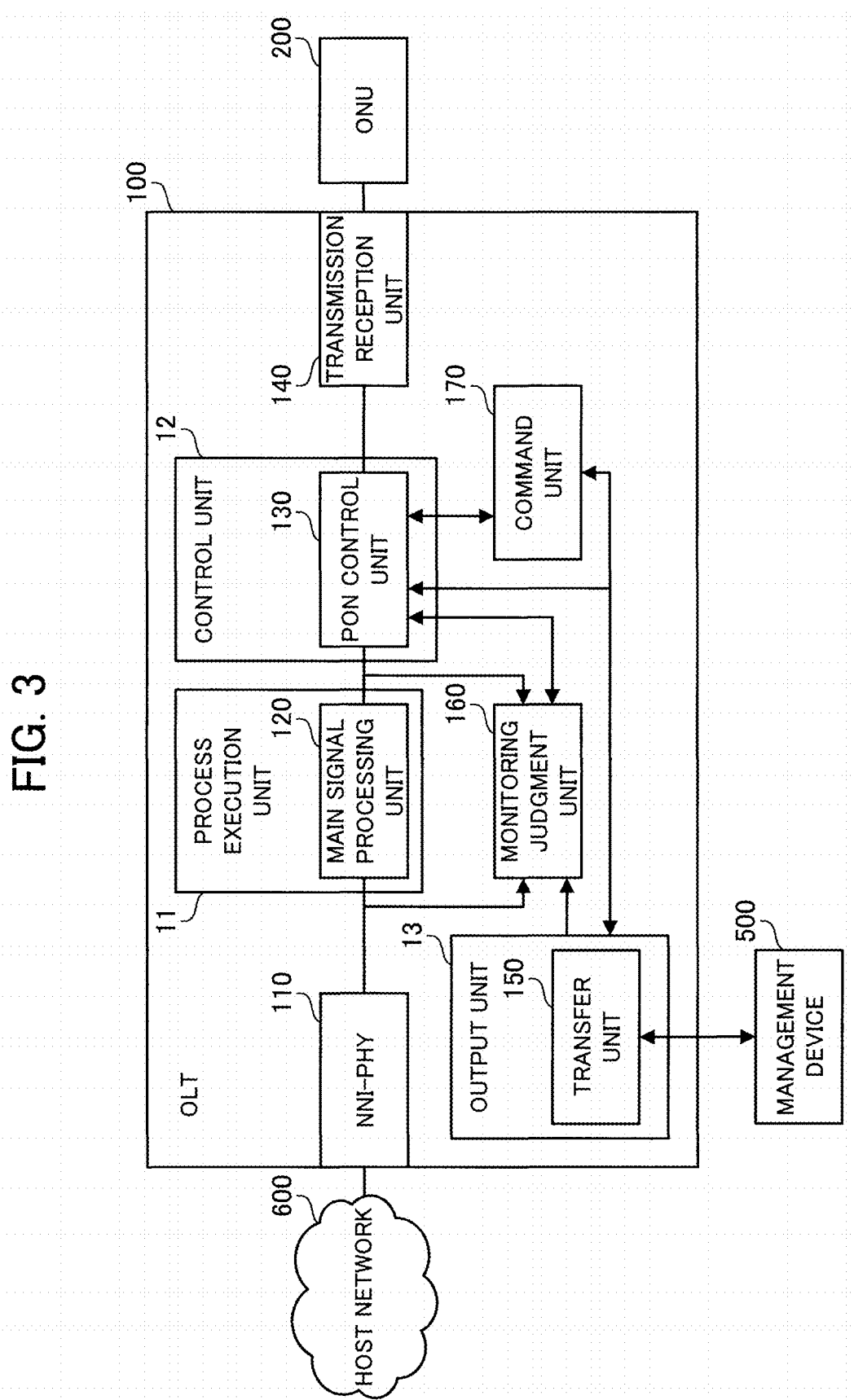
FIG. 3 is a functional block diagram showing the configuration of the OLT in the first embodiment.

FIG. 3 is a functional block diagram showing the configuration of the OLT in the first embodiment. The OLT 100 includes a Network Node Interface (NNI)-PHY 110, a main signal processing unit 120, a PON control unit 130, a transmission reception unit 140, a transfer unit 150, a monitoring judgment unit 160 and a command unit 170.

Part or all of the main signal processing unit 120, the PON control unit 130, the transmission reception unit 140, the transfer unit 150, the monitoring judgment unit 160 and the command unit 170 may be implemented by the processor 101.

Part or all of the main signal processing unit 120, the PON control unit 130, the transmission reception unit 140, the transfer unit 150, the monitoring judgment unit 160 and the command unit 170 may be implemented as modules of a program executed by the processor 101.

First, a normal operation in the OLT 100 will be described below.

The NNI-PHY 110 is a physical interface. When a frame is received from the host network 600, the NNI-PHY 110 transmits the frame to the main signal processing unit 120. When a frame is received from the main signal processing unit 120, the NNI-PHY 110 transmits the frame to the host network 600.

The main signal processing unit 120 is referred to also as a process execution unit 11. The main signal processing unit 120 transmits frames to the PON control unit 130 according to predetermined transmission rules. The transmission rules vary from ONU to ONU. For example, the transmission rules specify that only frames provided with a specific Virtual Local Area Network (VLAN)-identifier (ID) should be transmitted to the PON control unit 130. Further, for example, the transmission rules specify that a frame should be transmitted to the PON control unit 130 if a Media Access Control (MAC) address of the destination of the frame exists in an entry obtained by learning MAC addresses. Furthermore, for example, the transmission rules specify that only frames including an IP address snooped in a DHCP sequence should be transmitted to the PON control unit 130. Moreover, for example, the transmission rules specify control of protocols in the layer 3.

Similarly, the main signal processing unit 120 transmits frames to the NNI-PHY 110 according to predetermined transmission rules.

The PON control unit 130 is referred to also as a control unit 12. The PON control unit 130 executes PON interface control. When a frame transmission command is received from the transfer unit 150, the PON control unit 130 transmits a frame to the transmission reception unit 140. When a warning from an ONU 200 is received via the transmission reception unit 140, the PON control unit 130 notifies the transfer unit 150 of the warning. Further, the PON control unit 130 notifies the transfer unit 150 of status of the OLT 100 and the ONU 200. The PON control unit 130 receives a frame content transmission request and a setting request to an ONU 200 from the transfer unit 150.

Furthermore, the PON control unit 130 uses Time Division Multiplexing Access (TDMA).

The transmission reception unit 140 has an Optical/Electrical (O/E) conversion function. When a frame as an electric signal is received from the PON control unit 130, the transmission reception unit 140 converts the electric signal to an optical signal. The transmission reception unit 140 transmits the optical signal to the ONU 200. When an optical signal including a frame is received from the ONU 200, the transmission reception unit 140 converts the optical signal to an electric signal. The transmission reception unit 140 transmits the frame as the electric signal to the PON control unit 130. Further, the transmission reception unit 140 has a Wavelength Division Multiplexing (WDM) function.

The transfer unit 150 is referred to also as an input-output unit or an output unit 13. The transfer unit 150 transfers information. For example, upon receiving present status of the OLT 100 and the ONU 200 from the PON control unit 130, the transfer unit 150 transfers the status to the management device 500. Further, for example, upon receiving PON control contents to be set to the OLT 100 and the ONU 200 from the management device 500, the transfer unit 150 transfers the PON control contents to the PON control unit 130. Furthermore, for example, upon receiving an information acquisition request regarding the OLT 100 and the ONU 200 from the management device 500, the transfer unit 150 transfers the information acquisition request to the PON control unit 130.

Next, a description will be given of a process of identifying a frame discarding place from the inside of the OLT 100.

The transfer unit 150 transfers a specific pattern in a test frame received from the management device 500 to the monitoring judgment unit 160. Here, the test frame and the specific pattern will be described below.

Figure 4:
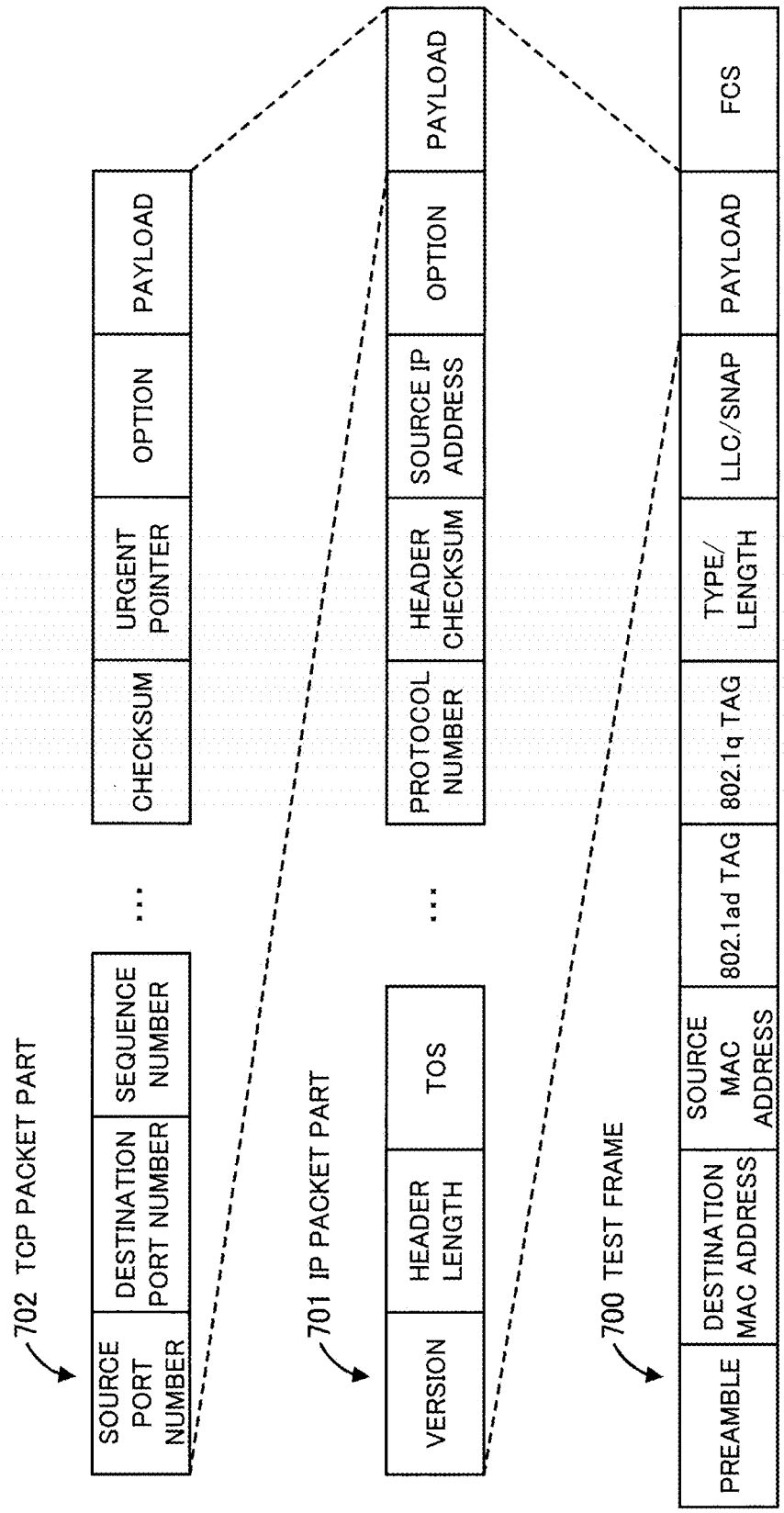
FIG. 4 is a diagram showing an example (No. 1) of a test frame in the first embodiment.

FIG. 4 is a diagram showing an example (No. 1) of the test frame in the first embodiment. The format of the test frame 700 corresponds to the format of both of the Ethernet II frame and the IEEE 802.3 LLC frame. Incidentally, Ethernet is a registered trademark. IEEE 802.3 is described in Non-patent Reference 1.

The test frame 700 includes a preamble, a destination MAC address, a source MAC address, an 802.1ad tag, an 802.1q tag, a type/length, an LLC/SNAP, a payload and an FCS.

The contents of the 802.1ad tag comply with the contents specified in IEEE 802.1ad. The 802.1ad tag may include either any intended value or no value. The contents of the 802.1q tag comply with the contents specified in IEEE 802.1q. The 802.1q tag may include either any intended value or no value. The LLC/SNAP may include either any intended value or no value. The payload includes an Internet Protocol (IP) packet part 701.

The IP packet part 701 includes a version, a header length, a TOS, a datagram length, an ID, a flag, a fragment offset, a TTL, a protocol number, a header-checksum, a source IP address, an option and a payload. In FIG. 4, a part of the IP packet part 701 is left out.

The IP packet part 701 complies with the contents specified in RFC 791. RFC 791 is described in Non-patent Reference 2. The payload includes a Transmission Control Protocol (TCP) packet part 702.

The TCP packet part 702 includes a source port number, a destination port number, a sequence number, an acknowledgement number, a data offset, a reservation, a control flag, a window size, a checksum, an urgent pointer, an option and a payload. In FIG. 4, a part of the TCP packet part 702 is left out.

The TCP packet part 702 complies with the contents specified in RFC 793. RFC 793 is described in Non-patent Reference 3.

Figure 5:
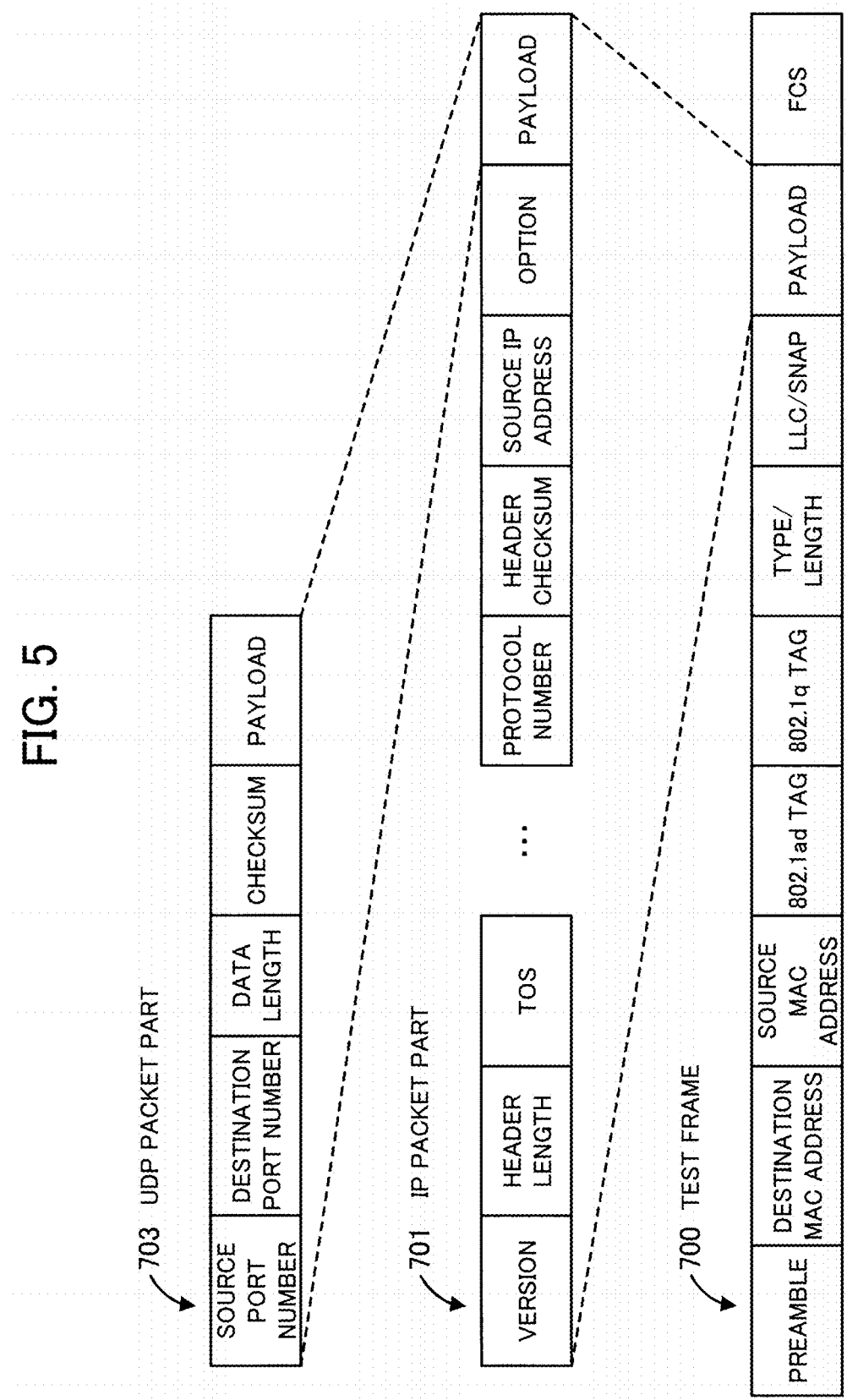
FIG. 5 is a diagram showing an example (No. 2) of the test frame in the first embodiment.

FIG. 5 is a diagram showing an example (No. 2) of the test frame in the first embodiment. The format of the test frame 700 and the format of the IP packet part 701 are the same as those in FIG. 4. In FIG. 5, the payload of the IP packet part 701 includes a User Datagram Protocol (UDP) packet part 703.

The UDP packet part 703 includes a source port number, a destination port number, a data length, a checksum and a payload. The UDP packet part 703 complies with the contents specified in RFC 793.

Here, the specific pattern is some part of the information included in the payload of the test frame 700. Alternatively, the specific pattern is some part of the information included in the payload of the IP packet part 701. Alternatively, the specific pattern is some part of the information included in the payload of the TCP packet part 702 or the UDP packet part 703.

Returning to FIG. 3, the functional blocks will be described below.

The transmission reception unit 140 receives a frame transmitted by the ONU 200. The transmission reception unit 140 transmits the frame to the PON control unit 130.

When the frame transmitted by the transmission reception unit 140 is received, the PON control unit 130 judges whether or not the transmission reception unit 140 received the frame at predetermined timing. Specifically, the PON control unit 130 judges whether or not the transmission reception unit 140 received the frame at a predetermined time of day. If the transmission reception unit 140 received the frame at the timing and the frame is not damaged, the PON control unit 130 transmits the frame to the main signal processing unit 120.

If the transmission reception unit 140 did not receive the frame at the timing, the PON control unit 130 discards the frame. Further, if the frame is damaged, the PON control unit 130 discards the frame. Furthermore, when a failure has occurred in the PON control unit 130, the frame is discarded.

The main signal processing unit 120 executes a judgment process of judging whether the frame transmitted by the PON control unit 130 is a test frame or not. For example, the main signal processing unit 120 judges that the frame is a test frame when information indicating that the frame is a test frame is included in the frame. Further, the monitoring judgment unit 160 acquires the specific pattern as will be described later. The main signal processing unit 120 may acquire the specific pattern from the monitoring judgment unit 160. Then, the main signal processing unit 120 may execute the judgment process of judging whether the frame is a test frame or not based on the specific pattern. Here, the test frame is referred to also as a specific frame. The specific frame is a frame being specific.

If the frame is a test frame, the main signal processing unit 120 executes a process of transmitting the frame to the NNI-PHY 110. If the frame is not a test frame, the main signal processing unit 120 discards the frame. Further, when a failure has occurred in the main signal processing unit 120, the frame is discarded.

The monitoring judgment unit 160 executes at least one of a process of monitoring whether the frame passes between the PON control unit 130 and the main signal processing unit 120 within a predetermined first time or not and judging that the frame was discarded in the PON control unit 130 if the frame does not pass between the PON control unit 130 and the main signal processing unit 120 within the first time and a process of monitoring whether the frame passes between the main signal processing unit 120 and the NNI-PHY 110 within a predetermined second time or not and judging that the frame was discarded in the main signal processing unit 120 if the frame does not pass between the main signal processing unit 120 and the NNI-PHY 110 within the second time. In simple terms, the monitoring judgment unit 160 monitors whether or not the test frame passes between the PON control unit 130 and the main signal processing unit 120 and between the main signal processing unit 120 and the NNI-PHY 110. Then, the monitoring judgment unit 160 identifies the place where the frame was discarded based on the monitoring.

Here, starting times of the first time and the second time can be any time. For example, the starting time is the time when the monitoring judgment unit 160 started the monitoring or the time when the optical signal including the frame was received by the transmission reception unit 140.

The command unit 170 commands an ONU 200 via the PON control unit 130 and the transmission reception unit 140 to transmit a test frame.

When a frame is judged to have been discarded, the transfer unit 150 outputs information indicating the discarding place of the frame. For example, the transfer unit 150 outputs the information indicating the discarding place of the frame to the management device 500. Accordingly, the user can recognize the discarding place of the frame.

Figure 6:
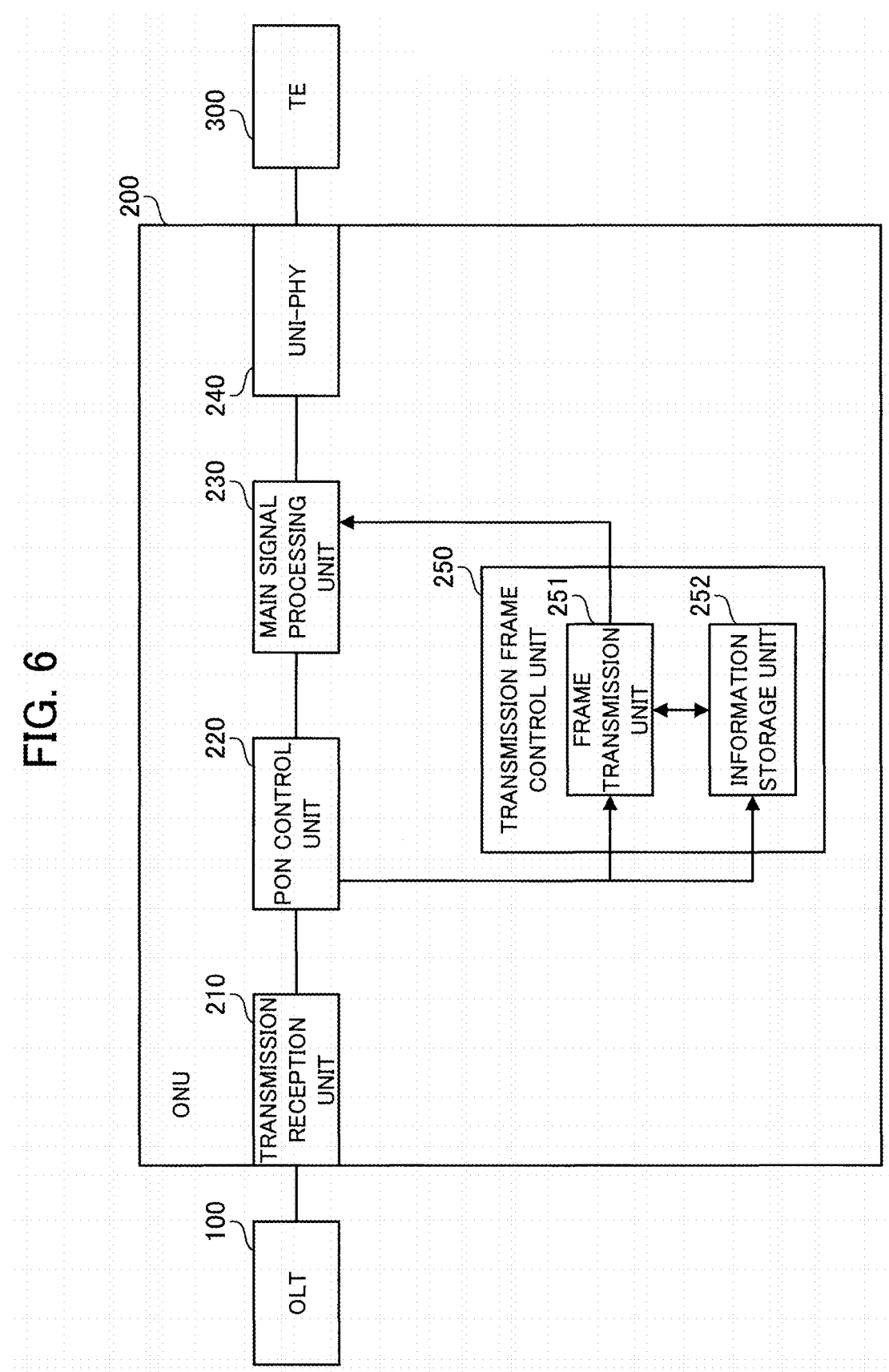
FIG. 6 is a functional block diagram showing the configuration of an ONU in the first embodiment.

FIG. 6 is a functional block diagram showing the configuration of the ONU in the first embodiment. The ONU 200 includes a transmission reception unit 210, a PON control unit 220, a main signal processing unit 230, a User Network Interface (UNI)-PHY 240, and a transmission frame control unit 250. The transmission frame control unit 250 includes a frame transmission unit 251 and an information storage unit 252.

Part or all of the transmission reception unit 210, the PON control unit 220, the main signal processing unit 230 and the transmission frame control unit 250 may be implemented by a processor included in the ONU 200.

Part or all of the transmission reception unit 210, the PON control unit 220, the main signal processing unit 230 and the transmission frame control unit 250 may be implemented as modules of a program executed by the processor included in the ONU 200.

The transmission reception unit 210 has the O/E conversion function. When a frame as an electric signal is received from the PON control unit 220, the transmission reception unit 210 converts the electric signal to an optical signal. The transmission reception unit 210 transmits the optical signal to the OLT 100. When an optical signal including a frame is received from the OLT 100, the transmission reception unit 210 converts the optical signal to an electric signal. The transmission reception unit 210 transmits the frame as the electric signal to the PON control unit 220.

The PON control unit 220 executes the PON interface control. The PON control unit 220 transmits a warning and the status of the ONU 200 to the OLT 100 via the transmission reception unit 210. Further, when a frame is received from the transmission reception unit 210, the PON control unit 220 transmits the frame to the main signal processing unit 230. When a frame is received from the main signal processing unit 230, the PON control unit 220 transmits the frame to the transmission reception unit 210.

The main signal processing unit 230 transmits frames to the UNI-PHY 240 according to predetermined transmission rules. The transmission rules vary from ONU to ONU. The transmission rules are dependent on the contents of settings notified from the OLT 100. For example, the transmission rules specify that only frames provided with a specific VLAN-ID should be transmitted to the UNI-PHY 240. Further, for example, the transmission rules specify that a frame should be transmitted to the UNI-PHY 240 if a MAC address of the destination of the frame exists in an entry obtained by learning MAC addresses. Furthermore, for example, the transmission rules specify that only frames including an IP address snooped in a DHCP sequence should be transmitted to the UNI-PHY 240. Moreover, for example, the transmission rules specify control of protocols in the layer 3.

Similarly, the main signal processing unit 230 transmits frames to the PON control unit 220 according to predetermined transmission rules.

The UNI-PHY 240 is a physical interface. The UNI-PHY 240 executes control of a UNI interface. When a frame is received from the main signal processing unit 230, the UNI-PHY 240 transmits the frame to the TE 300. When a frame is received from the TE 300, the UNI-PHY 240 transmits the frame to the main signal processing unit 230.

The frame transmission unit 251 and the information storage unit 252 will be described later.

Next, a process executed in the communication system will be described below by using a sequence diagram.

Figure 7:
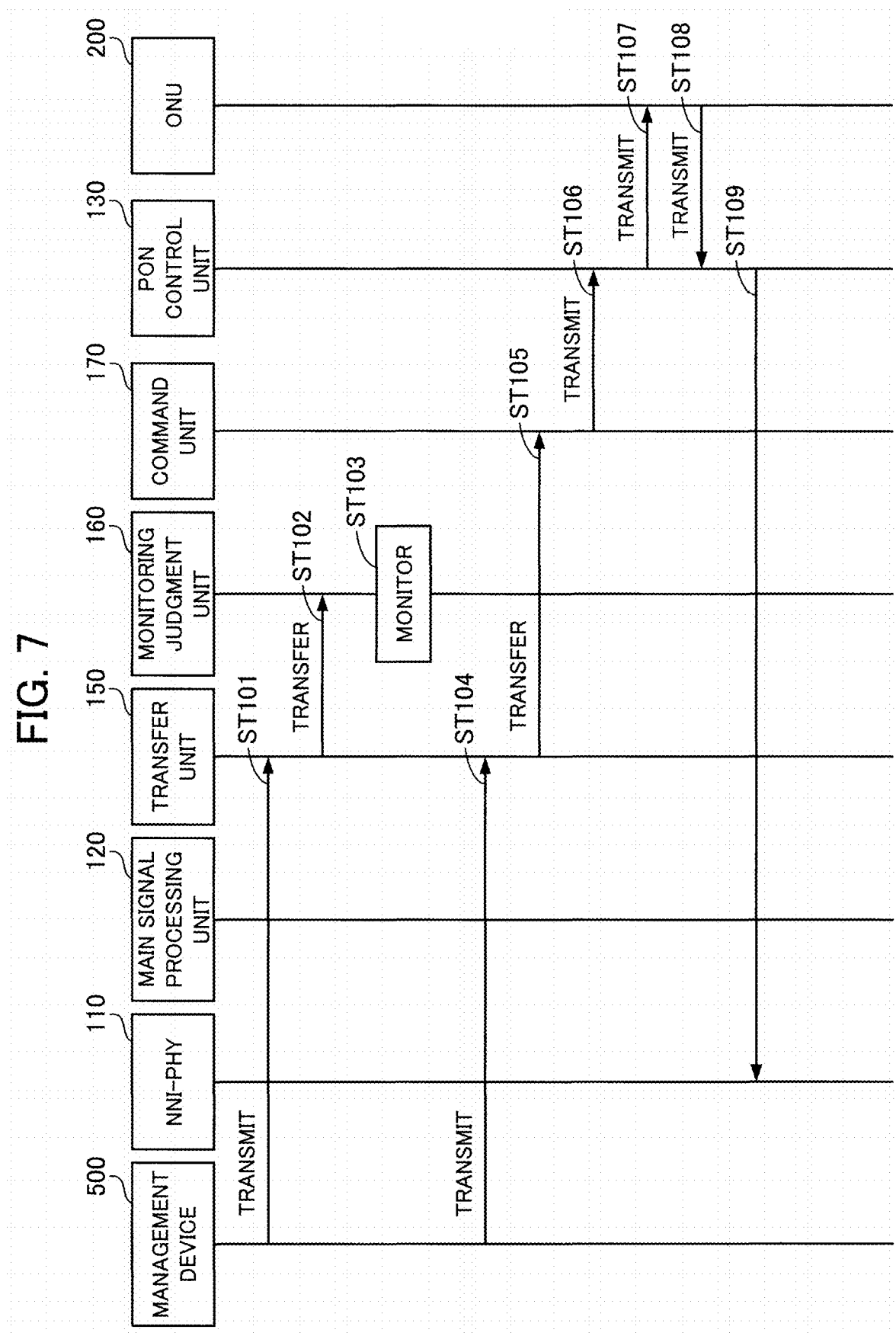
FIG. 7 is a sequence diagram (No. 1) showing an example of a process executed by the OLT and a management device in the first embodiment.

FIG. 7 is a sequence diagram (No. 1) showing an example of a process executed by the OLT and the management device in the first embodiment. In FIG. 7, the transmission reception unit 140 is left out.

(Step ST101) The user as an administrator inputs the specific pattern to the management device 500. The management device 500 transmits the specific pattern to the transfer unit 150.

(Step ST102) The transfer unit 150 transfers the specific pattern to the monitoring judgment unit 160. Accordingly, the monitoring judgment unit 160 can acquire the specific pattern.

(Step ST103) The monitoring judgment unit 160 starts the monitoring.

(Step ST104) The management device 500 transmits a test frame transmission command and an ID or a MAC address of an ONU as the target of the command to the transfer unit 150. Further, the transmission command includes a Logical Link (LL) ID corresponding to the ONU. Furthermore, the transmission command includes information indicating which the test frame of the test frame format of FIG. 4 or the test frame format of FIG. 5 should be transmitted.

(Step ST105) The transfer unit 150 transfers the test frame transmission command and the ID or the MAC address of the ONU as the target of the command to the command unit 170.

(Step ST106) The command unit 170 transmits the test frame transmission command to the PON control unit 130 in the format of extended OAM stipulated in IEEE 802.3ah. Further, the command unit 170 identifies the ONU as the destination of the transmission of the transmission command based on a table periodically received from the PON control unit 130 and the LLID included in the transmission command. Incidentally, this table indicates the LLID related to the ID of the ONU and the MAC address of the ONU. The identified ONU is represented as an ONU 200. The command unit 170 transmits information indicating the ONU 200 to the PON control unit 130.

(Step ST107) The PON control unit 130 transmits the test frame transmission command to the ONU 200 via the transmission reception unit 140.

(Step ST108) The ONU 200 transmits the test frame to the OLT 100.

(Step ST109) The monitoring judgment unit 160 monitors whether the test frame passes between the PON control unit 130 and the main signal processing unit 120. When the test frame does not pass between the PON control unit 130 and the main signal processing unit 120 within the first time, the monitoring judgment unit 160 judges that the place where the frame was discarded is the PON control unit 130. The process will be described in detail below.

First, when a frame does not pass between the PON control unit 130 and the main signal processing unit 120 within the first time, the monitoring judgment unit 160 judges that the place where the frame was discarded is the PON control unit 130. Incidentally, this frame is not limited to a test frame.

Next, when a frame passes between the PON control unit 130 and the main signal processing unit 120, the monitoring judgment unit 160 performs snooping on the frame. Incidentally, at the time point of performing the snooping, it cannot be determined whether this frame is a test frame or not. The monitoring judgment unit 160 compares the specific pattern acquired in the step ST102 with the specific pattern included in the frame. When the specific pattern acquired in the step ST102 and the specific pattern included in the frame coincide with each other, the monitoring judgment unit 160 judges that the frame is a test frame. The monitoring judgment unit 160 judges that the test frame has not been discarded. When the frame snooped within the first time is not a test frame, the monitoring judgment unit 160 judges that the place where the frame was discarded is the PON control unit 130.

Further, the monitoring judgment unit 160 monitors whether or not the test frame passes between the main signal processing unit 120 and the NNI-PHY 110. When the test frame does not pass between the main signal processing unit 120 and the NNI-PHY 110 within the second time, the monitoring judgment unit 160 judges that the place where the frame was discarded is the main signal processing unit 120. The process will be described in detail below.

First, when a frame does not pass between the main signal processing unit 120 and the NNI-PHY 110 within the second time, the monitoring judgment unit 160 judges that the place where the frame was discarded is the main signal processing unit 120. Incidentally, this frame is not limited to a test frame.

Next, when a frame passes between the main signal processing unit 120 and the NNI-PHY 110, the monitoring judgment unit 160 performs snooping on the frame. Incidentally, at the time point of performing the snooping, it cannot be determined whether this frame is a test frame or not. The monitoring judgment unit 160 compares the specific pattern acquired in the step ST102 with the specific pattern included in the frame. When the specific pattern acquired in the step ST102 and the specific pattern included in the frame coincide with each other, the monitoring judgment unit 160 judges that the frame is a test frame. The monitoring judgment unit 160 judges that the test frame has not been discarded. When the frame snooped within the second time is not a test frame, the monitoring judgment unit 160 judges that the place where the frame was discarded is the main signal processing unit 120.

Figure 8:
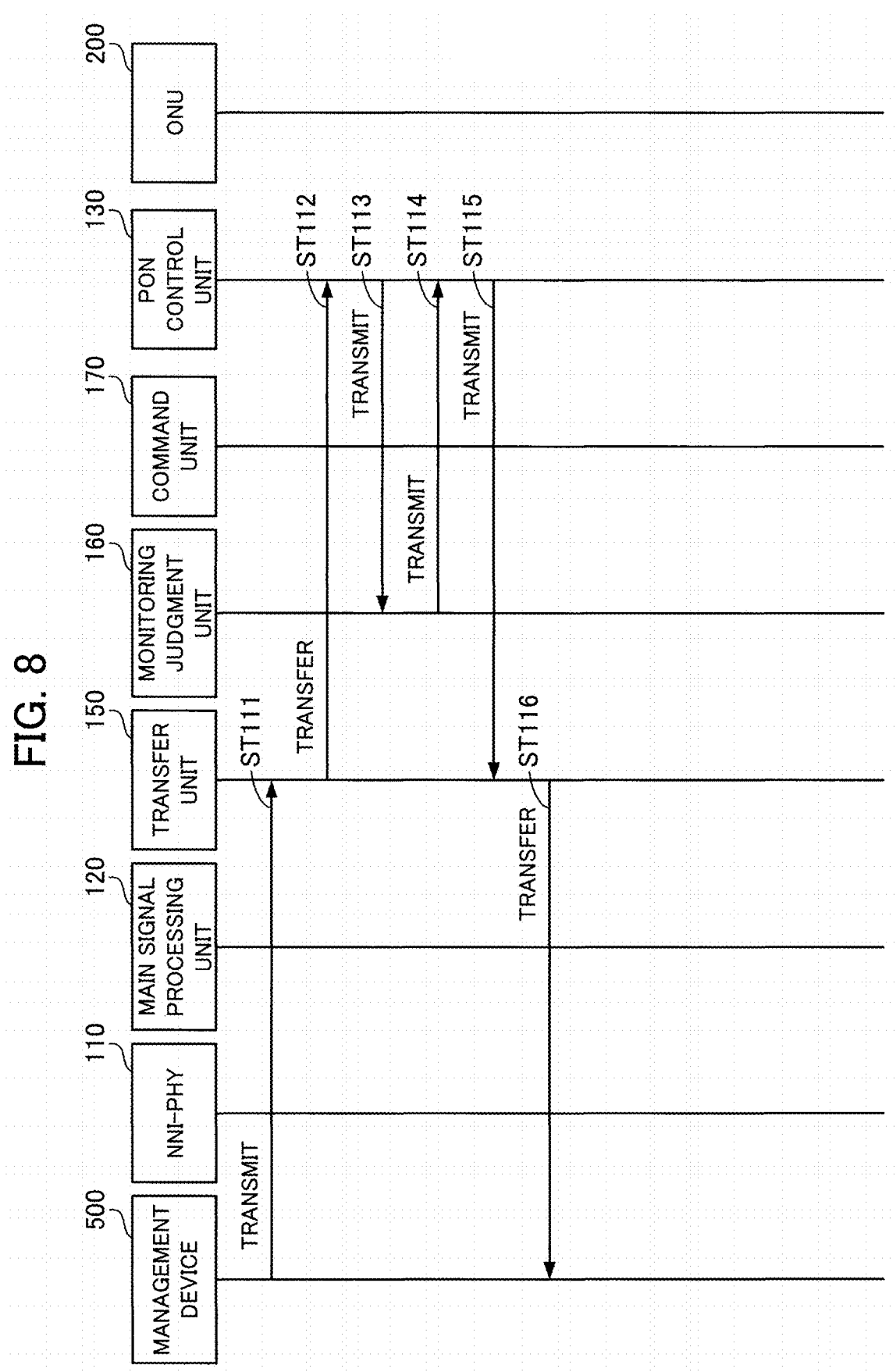
FIG. 8 is a sequence diagram (No. 2) showing an example of a process executed by the OLT and the management device in the first embodiment.

FIG. 8 is a sequence diagram (No. 2) showing an example of a process executed by the OLT and the management device in the first embodiment. In FIG. 8, the transmission reception unit 140 is left out.

(Step ST111) The management device 500 transmits a monitoring result request notification to the transfer unit 150.

(Step ST112) The transfer unit 150 transfers the monitoring result request notification to the PON control unit 130.

(Step ST113) The PON control unit 130 transmits the monitoring result request notification to the monitoring judgment unit 160.

(Step ST114) The monitoring judgment unit 160 transmits a monitoring result to the PON control unit 130.

(Step ST115) The PON control unit 130 transmits the monitoring result to the transfer unit 150.

(Step ST116) The transfer unit 150 transfers the monitoring result to the management device 500. Accordingly, the user as the administrator can learn the monitoring result. For example, the user can learn that a test frame does not pass between the PON control unit 130 and the main signal processing unit 120. Further, for example, the user can learn that the place where the test frame was discarded is the PON control unit 130.

Figure 9:
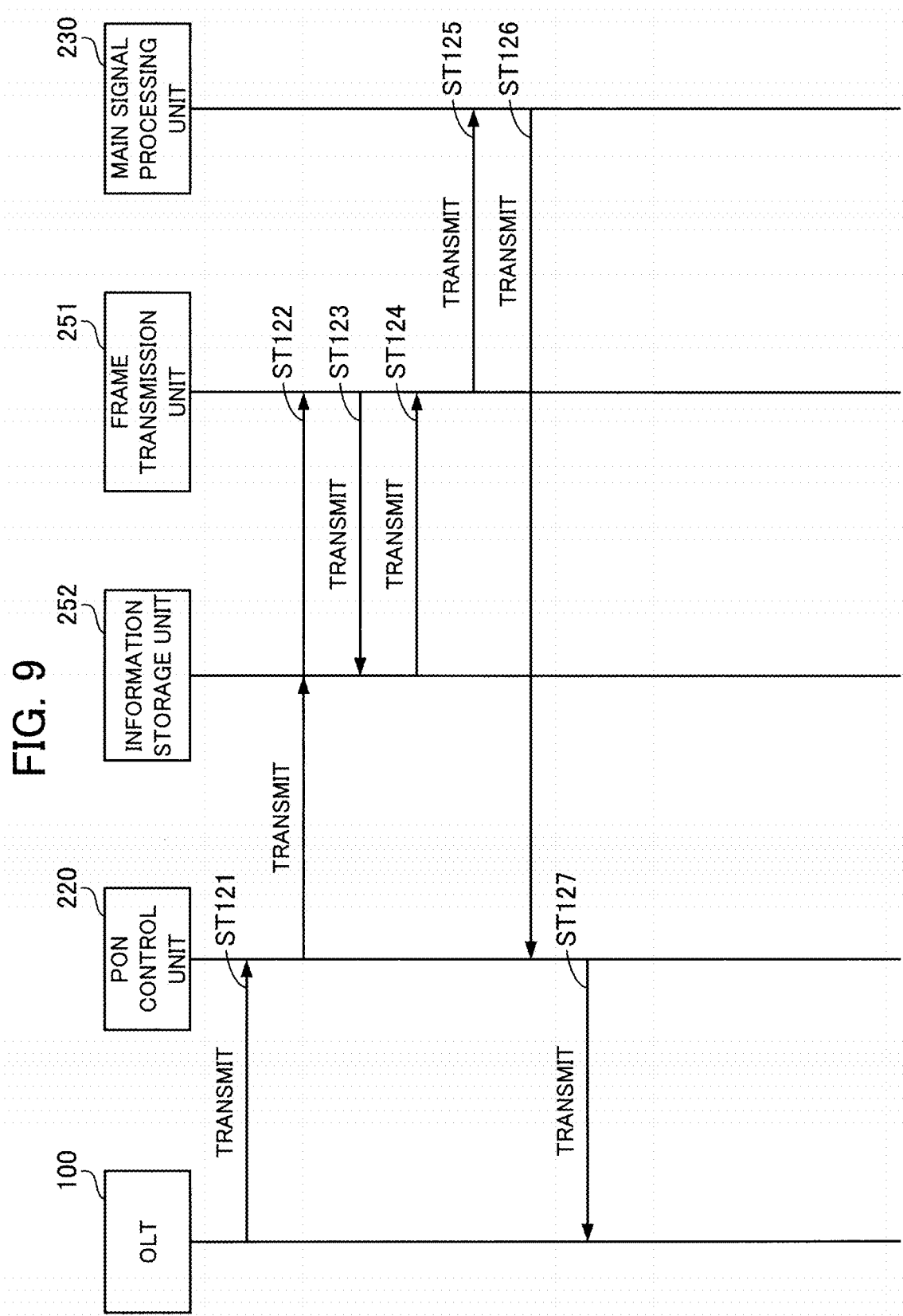
FIG. 9 is a sequence diagram showing an example of a process executed by the ONU in the first embodiment.

FIG. 9 is a sequence diagram showing an example of a process executed by the ONU in the first embodiment. In FIG. 9, the transmission reception unit 210 is left out.

(Step ST121) The OLT 100 transmits the test frame transmission command. Incidentally, this transmission process corresponds to the transmission process in the step ST107.

(Step ST122) The PON control unit 220 transmits the test frame transmission command to the frame transmission unit 251 and the information storage unit 252.

The information storage unit 252 refers to the transmission command and thereby checks which the test frame of the test frame format of FIG. 4 or the test frame format of FIG. 5 should be transmitted. The information storage unit 252 stores a parameter for setting to the test frame format determined by the check in the volatile storage device of the ONU 200.

(Step ST123) The frame transmission unit 251 transmits a parameter transmission request to the information storage unit 252.

(Step ST124) The information storage unit 252 transmits the parameter stored in the volatile storage device to the frame transmission unit 251. Further, after the parameter is transmitted to the frame transmission unit 251, the information storage unit 252 deletes the parameter stored in the volatile storage device.

(Step ST125) The frame transmission unit 251 generates the test frame based on the parameter. The frame transmission unit 251 transmits the test frame to the main signal processing unit 230.

(Step ST126) The main signal processing unit 230 transmits the test frame to the PON control unit 220.

(Step ST127) The PON control unit 220 transmits the test frame to the OLT 100 via the transmission reception unit 210. Incidentally, this transmission process corresponds to the transmission process in the step ST108.

Here, the process using the test frame may be executed any number of times in the communication system. Further, the specific pattern may be changed upon each execution of the process.

According to the first embodiment, the OLT 100 identifies the place where a frame is discarded in the OLT 100. Thus, the OLT 100 is capable of easily identifying the frame discarding place.

Further, the place where a frame is discarded has a possibility of having a bug. Thus, identifying the frame discarding place makes it easy to identify the cause of a failure.

The monitoring judgment unit 160 may monitor whether or not a frame passes between the transmission reception unit 140 and the PON control unit 130.

The process will be described in detail below. The transmission reception unit 140 receives an optical signal including a frame from an ONU 200. When an optical level of the optical signal is not a predetermined optical level, the transmission reception unit 140 discards the frame without transmitting the frame. When the optical level of the optical signal is the predetermined optical level, the transmission reception unit 140 transmits the frame to the PON control unit 130. The monitoring judgment unit 160 monitors whether or not the frame passes between the transmission reception unit 140 and the PON control unit 130 within a predetermined third time. When the frame does not pass between the transmission reception unit 140 and the PON control unit 130 within the third time, the monitoring judgment unit 160 judges that the frame was discarded in the transmission reception unit 140.

The first time, the second time and the third time may be either the same time or different times. It is permissible even if two or more of the first time, the second time and the third time are the same time.

Second Embodiment

Next, a second embodiment will be described below. In the second embodiment, the description will be given mainly of features different from those in the first embodiment. In the second embodiment, the description is omitted for features in common with the first embodiment. FIGS. 1 to 6 are referred to in the second embodiment.

In the first embodiment, the description is given of cases of identifying the frame discarding place in the OLT 100. In the second embodiment, a description will be given of cases of identifying the frame discarding place in an ONU.

Figure 10:
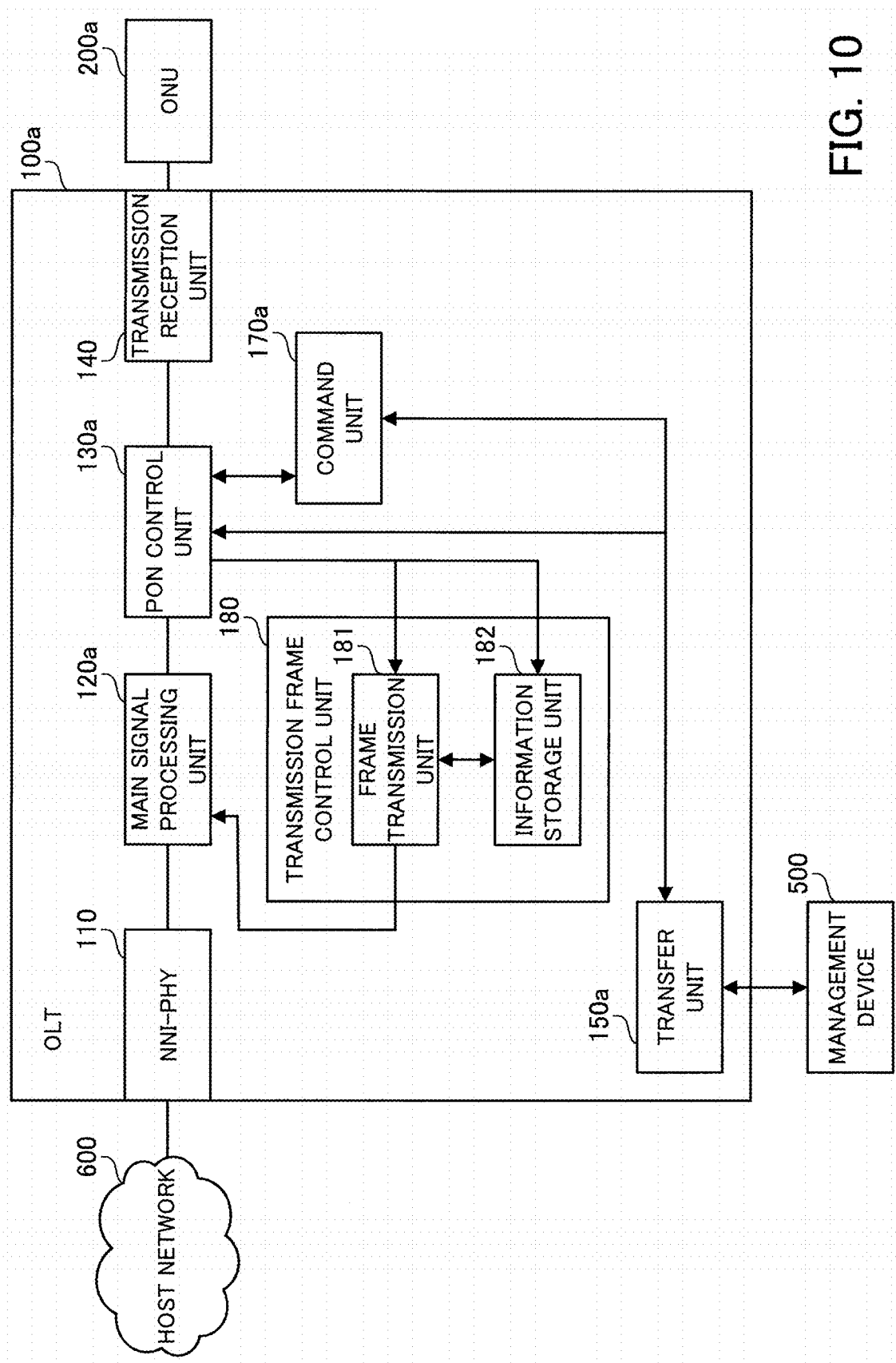
FIG. 10 is a functional block diagram showing the configuration of an OLT in a second embodiment.

FIG. 10 is a functional block diagram showing the configuration of an OLT in the second embodiment. The OLT 100a includes a main signal processing unit 120a, a PON control unit 130a, a transfer unit 150a, a command unit 170a and a transmission frame control unit 180. The transmission frame control unit 180 includes a frame transmission unit 181 and an information storage unit 182. Each component in FIG. 10 being the same as a component shown in FIG. 3 is assigned the same reference character as in FIG. 3.

The main signal processing unit 120a, the PON control unit 130a, the transfer unit 150a, the command unit 170a, the frame transmission unit 181 and the information storage unit 182 will be described in detail later.

Figure 11:
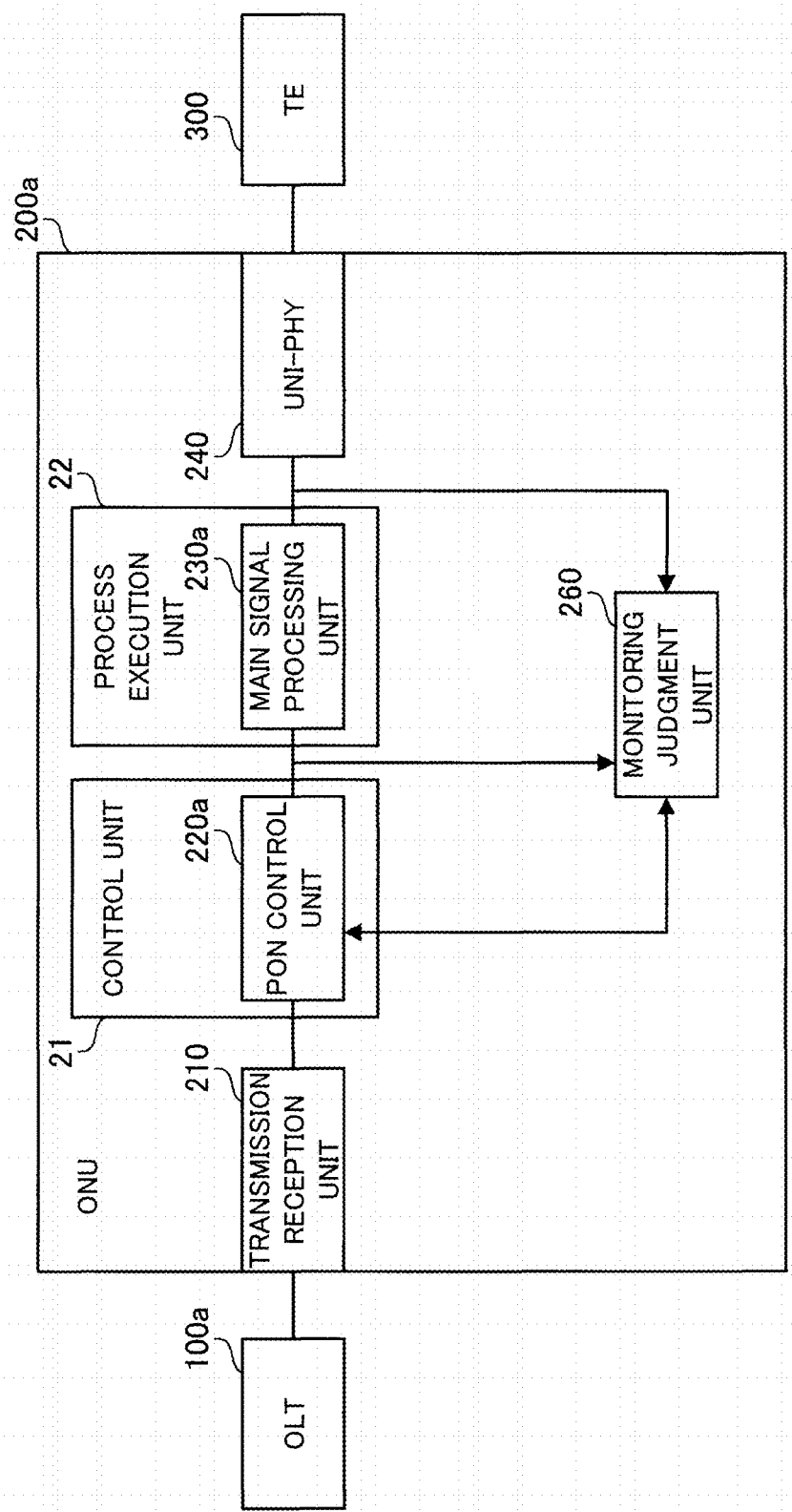
FIG. 11 is a functional block diagram showing the configuration of an ONU in the second embodiment.

FIG. 11 is a functional block diagram showing the configuration of an ONU in the second embodiment. The ONU 200a includes a PON control unit 220a, a main signal processing unit 230a and a monitoring judgment unit 260. Each component in FIG. 11 being the same as a component shown in FIG. 6 is assigned the same reference character as in FIG. 6.

The PON control unit 220a is referred to also as a control unit 21. The main signal processing unit 230a is referred to also as a process execution unit 22.

The transmission reception unit 210 receives a frame transmitted by the OLT 100a. The transmission reception unit 210 transmits the frame to the PON control unit 220a.

When the frame transmitted by the transmission reception unit 210 is received, the PON control unit 220a judges whether or not the frame is damaged. If the frame is not damaged, the PON control unit 220a transmits the frame to the main signal processing unit 230a. If the frame is damaged, the PON control unit 220a discards the frame. Further, when a failure has occurred in the PON control unit 220a, the frame is discarded.

The main signal processing unit 230a executes a judgment process of judging whether the frame transmitted by the PON control unit 220a is a test frame or not. For example, the main signal processing unit 230a judges that the frame is a test frame when information indicating that the frame is a test frame is included in the frame. Further, the monitoring judgment unit 260 acquires the specific pattern as will be described later. The main signal processing unit 230a may acquire the specific pattern from the monitoring judgment unit 260. Then, the main signal processing unit 230a may execute the judgment process of judging whether the frame is a test frame or not based on the specific pattern. Here, the test frame is referred to also as the specific frame. The specific frame is a frame being specific.

If the frame is a test frame, the main signal processing unit 230a executes a process of transmitting the frame to the UNI-PHY 240. If the frame is not a test frame, the main signal processing unit 230a discards the frame. Further, when a failure has occurred in the main signal processing unit 230a, the frame is discarded.

The monitoring judgment unit 260 executes at least one of a process of monitoring whether the frame passes between the PON control unit 220a and the main signal processing unit 230a within a predetermined first time or not and judging that the frame was discarded in the PON control unit 220a if the frame does not pass between the PON control unit 220a and the main signal processing unit 230a within the first time and a process of monitoring whether the frame passes between the main signal processing unit 230a and the UNI-PHY 240 within a predetermined second time or not and judging that the frame was discarded in the main signal processing unit 230a if the frame does not pass between the main signal processing unit 230a and the UNI-PHY 240 within the second time. In simple terms, the monitoring judgment unit 260 monitors whether or not the test frame passes between the PON control unit 220a and the main signal processing unit 230a and between the main signal processing unit 230a and the UNI-PHY 240. Then, the monitoring judgment unit 260 identifies the place where the frame was discarded based on the monitoring.

Here, the starting times of the first time and the second time can be any time. For example, the starting time is the time when the monitoring judgment unit 260 starts the monitoring or the time when the transmission reception unit 210 receives the optical signal including the frame.

Next, a process executed in the communication system will be described below by using a sequence diagram. Here, the communication system includes the OLT 100a and the ONUs 200a.

Figure 12:
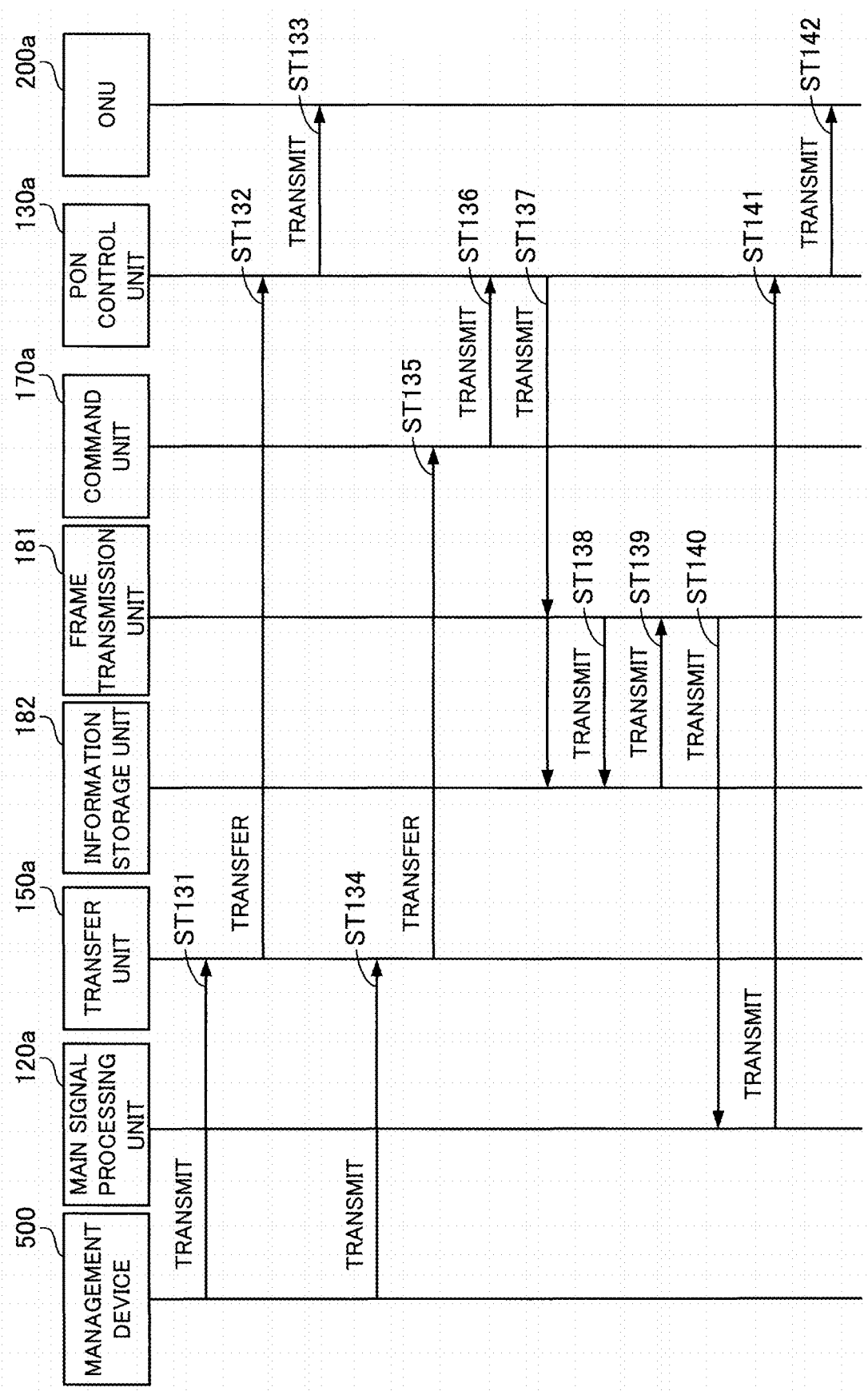
FIG. 12 is a sequence diagram (No. 1) showing an example of a process executed by the OLT and a management device in the second embodiment.

FIG. 12 is a sequence diagram (No. 1) showing an example of a process executed by the OLT and the management device in the second embodiment. In FIG. 12, the NNI-PHY 110 and the transmission reception unit 140 are left out.

(Step ST131) The user as the administrator inputs the specific pattern to the management device 500. The management device 500 transmits the specific pattern to the transfer unit 150a.

(Step ST132) The transfer unit 150a transfers the specific pattern to the PON control unit 130a.

(Step ST133) The PON control unit 130a transmits the specific pattern to the ONU 200a. Accordingly, the monitoring judgment unit 260 of the ONU 200a can acquire the specific pattern.

(Step ST134) The management device 500 transmits a test frame transmission command and an ID or a MAC address of the OLT 100a as the target of the command to the transfer unit 150a. Further, the transmission command includes an LLID corresponding to the OLT 100a. Furthermore, the transmission command includes information indicating which the test frame of the test frame format of FIG. 4 or the test frame format of FIG. 5 should be transmitted.

(Step ST135) The transfer unit 150a transfers the test frame transmission command and the ID or the MAC address of the OLT 100a to the command unit 170a.

(Step ST136) The command unit 170a transmits the test frame transmission command to the PON control unit 130a in the format of extended OAM stipulated in IEEE 802.3ah. Further, the command unit 170a identifies the OLT 100a as the destination of the transmission of the transmission command based on a table periodically received from the PON control unit 130a and the LLID included in the transmission command. Incidentally, this table indicates the LLID related to the ID of the OLT 100*a* and the MAC address of the OLT 100*a*. The command unit 170*a* transmits information indicating the OLT 100*a* to the PON control unit 130*a*.

(Step ST137) The PON control unit 130*a* transmits the test frame transmission command to the frame transmission unit 181 and the information storage unit 182.

The information storage unit 182 refers to the transmission command and thereby checks which the test frame of the test frame format of FIG. 4 or the test frame format of FIG. 5 should be transmitted. The information storage unit 182 stores a parameter for setting to the test frame format determined by the check in the volatile storage device 102.

(Step ST138) The frame transmission unit 181 transmits a parameter transmission request to the information storage unit 182.

(Step ST139) The information storage unit 182 transmits the parameter stored in the volatile storage device 102 to the frame transmission unit 181. Further, after the parameter is transmitted to the frame transmission unit 181, the information storage unit 182 deletes the parameter stored in the volatile storage device 102.

(Step ST140) The frame transmission unit 181 generates the test frame based on the parameter. The frame transmission unit 181 transmits the test frame to the main signal processing unit 120*a*.

(Step ST141) The main signal processing unit 120*a* transmits the test frame to the PON control unit 130*a*.

(Step ST142) The PON control unit 130*a* transmits the test frame to the ONU 200*a* via the transmission reception unit 140.

FIG. 13 is a sequence diagram (No. 2) showing an example of a process executed by the OLT and the management device in the second embodiment. In FIG. 13, the NNI-PHY 110 and the transmission reception unit 140 are left out.

(Step ST151) The management device 500 transmits a monitoring result request notification to the transfer unit 150*a*.

(Step ST152) The transfer unit 150*a* transfers the monitoring result request notification to the PON control unit 130*a*.

(Step ST153) The PON control unit 130*a* transmits the monitoring result request notification to the ONU 200*a*.

(Step ST154) The ONU 200*a* transmits a monitoring result to the PON control unit 130*a*.

(Step ST155) The PON control unit 130*a* transmits the monitoring result to the transfer unit 150*a*.

(Step ST156) The transfer unit 150*a* transfers the monitoring result to the management device 500. Accordingly, the user as the administrator can learn the monitoring result.

As above, when a frame is judged to have been discarded, the OLT 100*a* receives information indicating the frame discarding place from the ONU 200*a*. The OLT 100*a* outputs information indicating the frame discarding place.

FIG. 14 is a sequence diagram showing an example of a process executed by the ONU in the second embodiment. In FIG. 14, the transmission reception unit 210 is left out.

(Step ST161) The OLT 100*a* transmits the specific pattern to the monitoring judgment unit 260 via the transmission reception unit 210 and the PON control unit 220*a*. Accordingly, the monitoring judgment unit 260 can acquire the specific pattern. Incidentally, this transmission process corresponds to the transmission process in the step ST133.

(Step ST162) The monitoring judgment unit 260 starts monitoring.

(Step ST163) The OLT 100*a* transmits the test frame to the ONU 200*a*. Incidentally, this transmission process corresponds to the transmission process in the step ST142.

(Step ST164) The monitoring judgment unit 260 monitors whether or not the test frame passes between the PON control unit 220*a* and the main signal processing unit 230*a*. When the test frame does not pass between the PON control unit 220*a* and the main signal processing unit 230*a* within the first time, the monitoring judgment unit 260 judges that the place where the frame was discarded is the PON control unit 220*a*. The process will be described in detail below.

First, when a frame does not pass between the PON control unit 220*a* and the main signal processing unit 230*a* within the first time, the monitoring judgment unit 260 judges that the place where the frame was discarded is the PON control unit 220*a*. Incidentally, this frame is not limited to a test frame.

Next, when a frame passes between the PON control unit 220*a* and the main signal processing unit 230*a*, the monitoring judgment unit 260 performs snooping on the frame. Incidentally, at the time point of performing the snooping, it cannot be determined whether this frame is a test frame or not. The monitoring judgment unit 260 compares the specific pattern acquired in the step ST161 with the specific pattern included in the frame. When the specific pattern acquired in the step ST161 and the specific pattern included in the frame coincide with each other, the monitoring judgment unit 260 judges that the frame is a test frame. The monitoring judgment unit 260 judges that the test frame has not been discarded. When the frame snooped within the first time is not a test frame, the monitoring judgment unit 260 judges that the place where the frame was discarded is the PON control unit 220*a*.

Further, the monitoring judgment unit 260 monitors whether or not the test frame passes between the main signal processing unit 230*a* and the UNI-PHY 240. When the test frame does not pass between the main signal processing unit 230*a* and the UNI-PHY 240 within the second time, the monitoring judgment unit 260 judges that the place where the frame was discarded is the main signal processing unit 230*a*. The process will be described in detail below.

First, when a frame does not pass between the main signal processing unit 230*a* and the UNI-PHY 240 within the second time, the monitoring judgment unit 260 judges that the place where the frame was discarded is the main signal processing unit 230*a*. Incidentally, this frame is not limited to a test frame.

Next, when a frame passes between the main signal processing unit 230*a* and the UNI-PHY 240, the monitoring judgment unit 260 performs snooping on the frame. Incidentally, at the time point of performing the snooping, it cannot be determined whether this frame is a test frame or not. The monitoring judgment unit 260 compares the specific pattern acquired in the step ST161 with the specific pattern included in the frame. When the specific pattern acquired in the step ST161 and the specific pattern included in the frame coincide with each other, the monitoring judgment unit 260 judges that the frame is a test frame. The monitoring judgment unit 260 judges that the test frame has not been discarded. When the frame snooped within the second time is not a test frame, the monitoring judgment unit 260 judges that the place where the frame was discarded is the main signal processing unit 230*a*.

(Step ST165) The OLT 100*a* transmits a monitoring result request notification to the PON control unit 220*a* via the transmission reception unit 210. Incidentally, this transmission process corresponds to the transmission process in the step ST153.

(Step ST166) The PON control unit 220a transmits the monitoring result request notification to the monitoring judgment unit 260.

(Step ST167) The monitoring judgment unit 260 transmits a monitoring result to the PON control unit 220a.

(Step ST168) The PON control unit 220a transmits the monitoring result to the OLT 100a via the transmission reception unit 210. Incidentally, this transmission process corresponds to the transmission process in the step ST154.

Here, the process using the test frame may be executed any number of times in the communication system. Further, the specific pattern may be changed upon each execution of the process.

According to the second embodiment, the ONU 200a identifies the place where a frame is discarded in the ONU 200a. Thus, the ONU 200a is capable of easily identifying the frame discarding place.

Further, the monitoring judgment unit 260 may monitor whether or not a test frame passes between the transmission reception unit 210 and the PON control unit 220a.

The process will be described in detail below. The transmission reception unit 210 receives an optical signal including a frame from the OLT 100a. When the optical level of the optical signal is not a predetermined optical level, the transmission reception unit 210 discards the frame without transmitting the frame. When the optical level of the optical signal is the predetermined optical level, the transmission reception unit 210 transmits the frame to the PON control unit 220a. The monitoring judgment unit 260 monitors whether or not the frame passes between the transmission reception unit 210 and the PON control unit 220a within a predetermined third time. When the frame does not pass between the transmission reception unit 210 and the PON control unit 220a within the third time, the monitoring judgment unit 260 judges that the frame was discarded in the transmission reception unit 210.

The first time, the second time and the third time may be either the same time or different times. It is permissible even if two or more of the first time, the second time and the third time are the same time.

Features in the embodiments described above can be appropriately combined with each other.

DESCRIPTION OF REFERENCE CHARACTERS

11: process execution unit, 12: control unit, 13: output unit, 21: control unit, 22: process execution unit, 100, 100a: OLT, 101: processor, 102: volatile storage device, 103: nonvolatile storage device, 110: NNI-PHY, 120, 120a: main signal processing unit, 130, 130a: PON control unit, 140: transmission reception unit, 150, 150a: transfer unit, 160: monitoring judgment unit, 170, 170a: command unit, 180: transmission frame control unit, 181: frame transmission unit, 182: information storage unit, 200, 200a, 200_1-200_n: ONU, 210: transmission reception unit, 220, 220a: PON control unit, 230, 230a: main signal processing unit, 240: UNI-PHY, 250: transmission frame control unit, 251: frame transmission unit, 252: information storage unit, 260: monitoring judgment unit, 300, 300_1-300_n: TE, 400: optical splitter, 500: management device, 600: host network, 700: test frame, 701: IP packet part, 702: TCP packet part, 703: UDP packet part.

What is claimed is:

1. An optical communication device as a master station device that communicates with a slave station device, the optical communication device comprising:
   a physical interface;
   a transmission receiving circuitry to receive a frame transmitted by the slave station device and transmit the frame;
   a controlling circuitry to judge whether the transmission receiving circuitry received the frame at predetermined timing or not when the frame transmitted by the transmission receiving circuitry is received and transmit the frame if the transmission receiving circuitry received the frame at the timing and the frame is not damaged;
   a process executing circuitry to execute a judgment process of judging whether or not the frame transmitted by the controlling circuitry is a specific frame as a frame being specific and execute a process of transmitting the frame to the physical interface if the frame is the specific frame; and
   a monitoring judgment circuitry to execute at least one of a process of monitoring whether the frame passes between the controlling circuitry and the process executing circuitry within a predetermined first time or not and judging that the frame was discarded in the controlling circuitry if the frame does not pass between the controlling circuitry and the process executing circuitry within the first time and a process of monitoring whether the frame passes between the process executing circuitry and the physical interface within a predetermined second time or not and judging that the frame was discarded in the process executing circuitry if the frame does not pass between the process executing circuitry and the physical interface within the second time.

2. The optical communication device according to claim 1, wherein
   the transmission receiving circuitry receives an optical signal including the frame and discards the frame without transmitting the frame when an optical level of the optical signal is not a predetermined optical level, and
   the monitoring judgment circuitry monitors whether the frame passes between the transmission receiving circuitry and the controlling circuitry within a predetermined third time or not and judges that the frame was discarded in the transmission receiving circuitry if the frame does not pass between the transmission receiving circuitry and the controlling circuitry within the third time.

3. The optical communication device according to claim 1, further comprising an outputting circuitry to output information indicating a discarding place of the frame when the frame is judged to have been discarded.

4. An optical communication device as a slave station device that communicates with a master station device, the optical communication device comprising:
   a physical interface;
   a transmission receiving circuitry to receive a frame transmitted by the master station device and transmit the frame;
   a controlling circuitry to judge whether the frame is damaged or not when the frame transmitted by the transmission receiving circuitry is received and transmit the frame if the frame is not damaged;
   a process executing circuitry to execute a judgment process of judging whether or not the frame transmitted by the controlling circuitry is a specific frame as a frame being specific and execute a process of transmitting the frame to the physical interface if the frame is the specific frame; and a monitoring judgment circuitry to execute at least one of a process of monitoring whether the frame passes between the controlling circuitry and the process executing circuitry within a predetermined first time or not and judging that the frame was discarded in the controlling circuitry if the frame does not pass between the controlling circuitry and the process executing circuitry within the first time and a process of monitoring whether the frame passes between the process executing circuitry and the physical interface within a predetermined second time or not and judging that the frame was discarded in the process executing circuitry if the frame does not pass between the process executing circuitry and the physical interface within the second time.

5. The optical communication device according to claim 4, wherein the transmission receiving circuitry receives an optical signal including the frame and discards the frame without transmitting the frame when an optical level of the optical signal is not a predetermined optical level, and the monitoring judgment circuitry monitors whether the frame passes between the transmission receiving circuitry and the controlling circuitry within a predetermined third time or not and judges that the frame was discarded in the transmission receiving circuitry if the frame does not pass between the transmission receiving circuitry and the controlling circuitry within the third time.

6. A communication system comprising:

a slave station device; and a master station device that communicates with the slave station device, wherein the master station device includes:

a physical interface;

a transmission receiving circuitry to receive a frame transmitted by the slave station device and transmit the frame;

a controlling circuitry to judge whether the transmission receiving circuitry received the frame at predetermined timing or not when the frame transmitted by the transmission receiving circuitry is received and transmit the frame if the transmission receiving circuitry received the frame at the timing and the frame is not damaged;

a process executing circuitry to execute a judgment process of judging whether or not the frame transmitted by the controlling circuitry is a specific frame as a frame being specific and execute a process of transmitting the frame to the physical interface if the frame is the specific frame; and a monitoring judgment circuitry to execute at least one of a process of monitoring whether the frame passes between the controlling circuitry and the process executing circuitry within a predetermined first time or not and judging that the frame was discarded in the controlling circuitry if the frame does not pass between the controlling circuitry and the process executing circuitry within the first time and a process of monitoring whether the frame passes between the process executing circuitry and the physical interface within a predetermined second time or not and judging that the frame was discarded in the process executing circuitry if the frame does not pass between the process executing circuitry and the physical interface within the second time.

7. A communication system comprising:

a master station device; and a slave station device that communicates with the master station device, wherein the slave station device includes:

a physical interface;

a transmission receiving circuitry to receive a frame transmitted by the master station device and transmit the frame;

a controlling circuitry to judge whether the frame is damaged or not when the frame transmitted by the transmission receiving circuitry is received and transmit the frame if the frame is not damaged;

a process executing circuitry to execute a judgment process of judging whether or not the frame transmitted by the controlling circuitry is a specific frame as a frame being specific and execute a process of transmitting the frame to the physical interface if the frame is the specific frame; and a monitoring judgment circuitry to execute at least one of a process of monitoring whether the frame passes between the controlling circuitry and the process executing circuitry within a predetermined first time or not and judging that the frame was discarded in the controlling circuitry if the frame does not pass between the controlling circuitry and the process executing circuitry within the first time and a process of monitoring whether the frame passes between the process executing circuitry and the physical interface within a predetermined second time or not and judging that the frame was discarded in the process executing circuitry if the frame does not pass between the process executing circuitry and the physical interface within the second time.

8. The communication system according to claim 7, wherein when the frame is judged to have been discarded, the master station device receives information indicating a discarding place of the frame from the slave station device and outputs information indicating the discarding place of the frame.

* * * * *